W. REMINGTON.
ELECTRIC METAL WORKING APPARATUS.
APPLICATION FILED OCT. 4, 1919.
1,344,961.
Patented June 29, 1920.
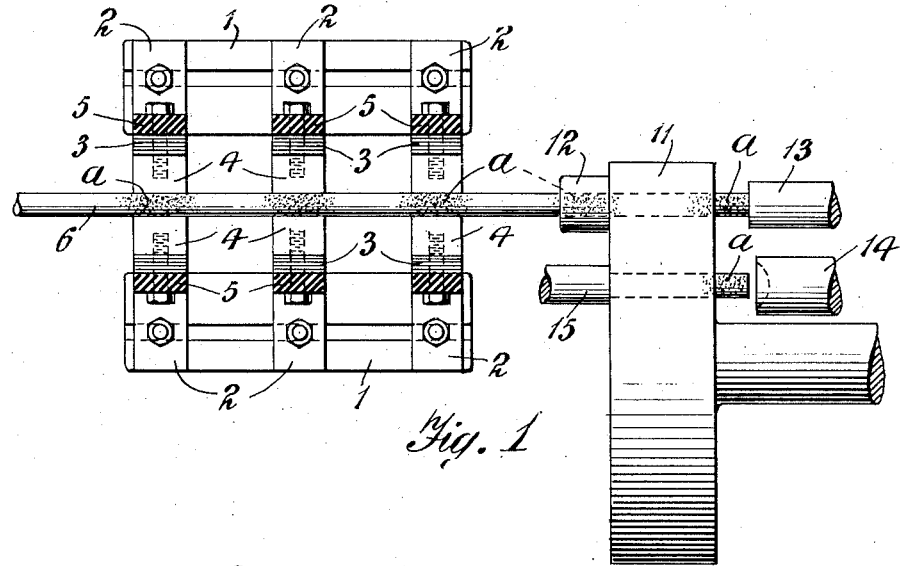
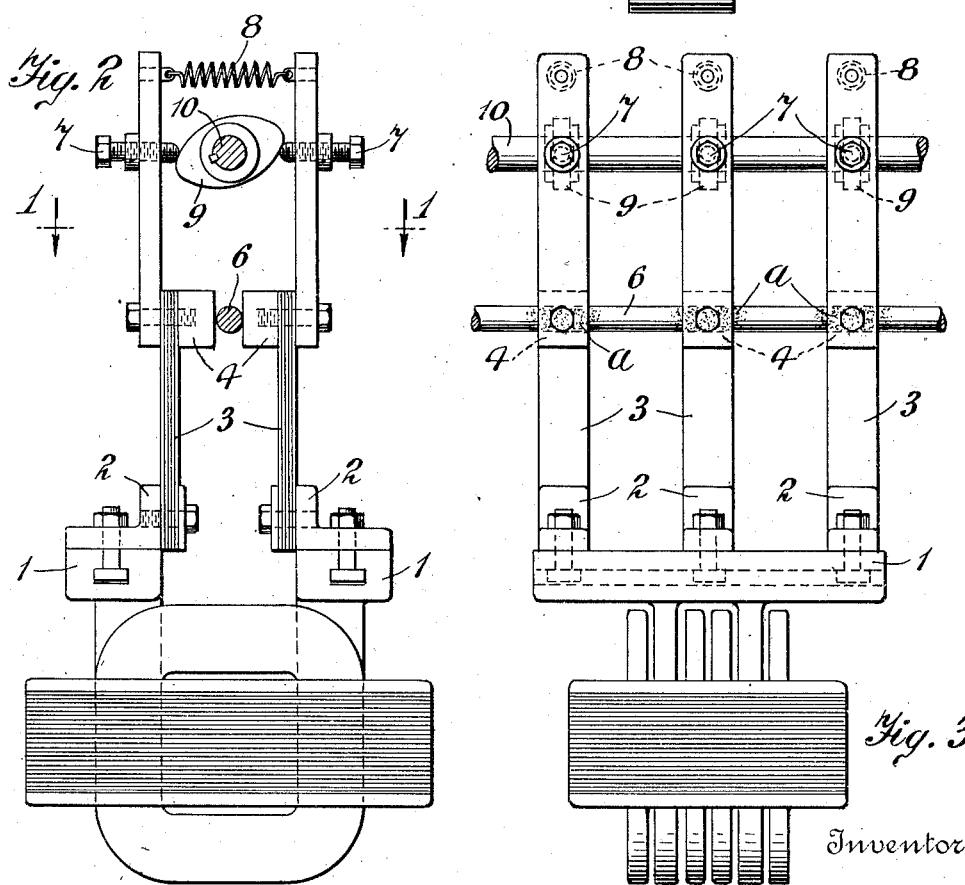
Inventor
Wolcott Remington
By his Attorneys

UNITED STATES PATENT OFFICE.

WOLCOTT REMINGTON, OF LYNN, MASSACHUSETTS, ASSIGNOR TO THOMSON ELECTRIC WELDING COMPANY, OF BOSTON, MASSACHUSETTS, A CORPORATION OF MASSACHUSETTS.

ELECTRIC METAL-WORKING APPARATUS.

1,344,961.  Specification of Letters Patent.  Patented June 29, 1920.

Application filed October 4, 1919. Serial No. 328,460.

*To all whom it may concern:*

Be it known that I, WOLCOTT REMINGTON, a citizen of the United States, and a resident of Lynn, in the county of Essex and State of Massachusetts, have invented certain new and useful Improvements in Electric Metal-Working Apparatus, of which the following is a specification.

My invention relates to electric metal working machines in which provision is made for heating the blanks or sections of stock fed into the machine for the metal working operation such as cutting, forging, bending or other act.

The invention relates more particularly to machines wherein there is an intermittent or step by step feed of the blanks or sections of stock into the machine timed to the metal working operations conducted upon the material in the machine itself.

The general object of my invention is to provide for the heating of the blanks or stock by an electric current in a machine of the above general character, without waste of current and without the necessity of slowing down the operation of the machine due to the fact that each cycle of operation in the machine itself upon the heated stock after the feeding of the stock or blank into the machine may, by reason of the mechanical construction, be readily completed in less time than is required to bring the blank or section of stock to the desired temperature by the action of the current.

In general my invention consists in the improved method of and apparatus and devices for heating the stock electrically at two or more of its positions in the successive steps of feeding it into the machine, each said step or position being a delayed position of feed during which the machine is performing its cycle of metal working or other operations, whereby, as will be hereinafter more fully made apparent, the actual heating of the blank or section of blank required to be heated is prolonged through two or more cycles of the machine's operation, and the blank is thereby brought to the requisite heat without slowing down the operations upon the heated blank or work.

My invention will be described as applied to a metal working machine in which the operation upon the heated work is a forging or heading operation conducted upon a wire or rod or section of wire or rod.

In the particular machine illustrated provision is also made for cutting off the desired length of blank after it is fed into the machine, the cutting being conducted upon a previously heated section of the rod, although as will be obvious to those skilled in the art, the latter feature might be omitted and the invention applied in a machine in which the operation upon the heated blank or section of blank is simply a forging operation.

In the accompanying drawings I have shown my invention applied to a machine designed to head bolts, so much of the machine only as is necessary to an understanding of my invention being illustrated, the mechanism for giving the desired motions to the stock and to the essential parts of the machine illustrated being well known in the art.

Figure 1 is a plan view of the apparatus showing the heating unit applied thereto.

Fig. 2 is an edge view of the heating unit.

Fig. 3 is a side view.

Referring to the drawings:

12 represents a die or hardened bushing through which the wire stock passes after it has been heated. 11 represents the turret of a bolt heading machine. 13 represents a stop against which the heated wire stock is fed to determine the length of the pieces which will be cut off. The cutting off action is by means of the rotation of the turret 11 which shears the wire between 11 and 12. 15 represents a kick-out piece which will force the stock further out if necessary before it is headed by the header 14. The parts so far described may be taken as typical of any metal working machine into which stock is fed step by step for successive operations or cycles of action of the machine. 6 indicates the wire rod or other stock fed to the machine step by step so that there shall be a fresh or new blank or piece of stock ready for the action of the machine after completion of the next preceding cycle of actions involved in a normal operation. The arrangement for feeding the stock 6 is not shown in the drawing as satisfactory feeding mechanisms are now being used in the cold heading machines. The mechanism for straightening this stock as it comes from the reel is not shown as the mechanisms in use at the present time would continue in use in connection with the heating unit.

The stock and parts are shown in position preparatory to the beginning of the heading operation and with the rod or stock in the position assumed at the end of its step forward in the feeding operation of the machine. The heated portions of the stock or blank are indicated by the shading $a$. The heating unit is shown as provided with three sets of heating electrodes 4 arranged to engage the rod or blank at opposite sides thereof and pass the heating current therethrough. Three pairs of electrodes 4 are shown but a greater or less number might be employed with the proviso, however, that one pair only would not be sufficient for the purposes of my invention and for the reason to be presently explained. These pairs of electrodes engage a run or portion of the stock in its guides or immediately before it is fed into the metal working portion of the machine, as will be readily seen. The remaining portions of the heating unit may be of the following construction or of any other suitable construction adapted to apply the heating to the same section of the rod at a number of points or steps in its step by step feed forward into the machine.

A rough description of the heating unit and its action is as follows:

1 represents the secondary of a transformer. 2 are copper or bronze angles which are held in 1 by bolts in such a manner that by releasing the bolts they can be moved closer together or farther apart. 3 are copper flexible leads attached to the blocks 2. 4 are copper blocks used for dies which come in contact with the stock to be heated. 5 are fiber or any non-conducting material and are secured to the copper leads 3. 7 are screws threaded through 5 and are held in place by lock nuts. 8 are springs. 9 are cams keyed to the shaft 10 so that the shaft when rotating will rotate these cams. The cams can also be slid lengthwise on the shaft so as to conform with the varying distances which might be required between the portions of the stock which are to be heated.

Assuming that an average bolt heading machine working on $\frac{3}{4}''$ stock is employed, the bolts may be headed cold and produced at the rate of about forty-five bolts a minute or approximately a bolt every 1 and $\frac{1}{2}$ seconds. But the time necessary for the flow of current to heat the stock to the necessary temperature through a single set of electrodes would be greater than the time required for the machine to complete its cycle of actions in turning out a headed piece of work. In order that the work may be brought up to the desired temperature without interfering with the normal operation of the machine upon the stock fed into it, my invention provides for heating the stock locally at several stages of its feed forward varying according to the size of stock and the speed of the heading or other metal working machine. In some cases two stages might be sufficient, others three and some might require four or more. The drawing shows arrangement of electrodes for three heating stages. In the heading machine mentioned above where the production would be one bolt in every one and one-half seconds, the three heating stages would permit of four and one-half seconds flow of current to bring the stock up to the required temperature. If more time than this were required, more pairs of electrodes would be used. The adjustability of the blocks to carry the electrodes is to provide for the proper heating of bolts of various lengths. If shorter bolts were to be made than those indicated in the drawing, these blocks would be brought closer together and also the whole heating element would be shoved up closer to the heading machine. This question of bringing the heating unit closer or farther from the heading machine for different lengths of bolts might be brought about in two ways. Either the whole transformer and heating element could be moved or the terminals of the secondaries 1 could be made long enough so that the first adjustable block 2 could be placed close up to the heading machine.

The elapsed time between the period in which stock leaves the last heating element until it is actually headed will be about three seconds on stock of $\frac{3}{4}''$ diameter and larger. Three or four seconds of time would not permit of any appreciable cooling of the stock and in such machines this heating unit would be feasible and a great advantage and it would permit the use of stock of a high tensile strength, much higher than is possible to use with a cold heading machine. It would also permit the use of a very much lighter heading machine, the first cost of which would be less and the up-keep cost would be much less, so in addition to giving bolts of a higher quality, the bolts would also be cheaper in their manufacture by the use of the heating unit.

The setting up and operation of the heating unit is as follows:

First a rod of the size of stock from which the bolts are to be made is placed between the dies 4 of the heating unit and the shaft 10 rotated until the long diameter of the cam 9 is between the points of the screws 7. The screws are then adjusted so that the dies or electrodes 4 do not quite touch the stock 6, blocks 2 having first been spaced properly for the length of bolt required. This setting up rod is then taken out of the unit and the wire stock brought in so that the end comes between and just beyond the first pair of electrodes. Then the switch is turned on and the current starts to flow from the electrode on one side of the rod to the electrode on the other side of the rod, so starting to heat the portion of the rod which is between the electrodes. The short diameter of the cam 9 is great enough to prevent the electrodes coming together in actual contact when no stock is between them. The cam shaft 10 is so timed with the feed mechanism of the machine that the electrodes 4 are released from any pressure against the stock just before the feed mechanism starts to operate. The feed mechanism will be adjusted so that it will feed the heated portion of the stock between the first electrodes into the proper position for being further heated by the second pair of electrodes and on its next period of operation it will feed this same portion into the proper position for the third set of electrodes to operate and so on down until finally the stock is fed up against the stop 13 of the machine.

With ordinary ranges of sizes of stock it will be found that flat faced electrodes can be utilized perfectly satisfactorily. On very large sizes the electrodes may be made to conform to a certain portion of the circumference of the stock as well understood in the art, but in very large sizes the stock would exceed the size in which it would be practicable to use it in the form of reels and it would have to be cut off to the proper length before being passed into the apparatus. In such case it would obviously only be necessary to locally heat one end of each section or piece of work fed between the electrodes to the heading, forging or other metal working portions of the apparatus.

What I claim as my invention is:—

1. In a metal working machine of the character described, a feedway having electrodes for heating the work at successive positions in its step by step feed forward into the metal working portion of the machine.

2. In a machine of the character described, the method of heating the work through a plurality of heating periods each period embracing a pause in the step by step feed of the work into the machine and each timed to the cycle of metal working operations.

3. In a machine of the character described, the method of locally heating a length of stock during its feed into the machine, consisting in feeding it step by step between a plurality of electrode jaws each arranged to engage the stock in its successive positions of rest between the steps of feeding.

4. The process of heating the work fed into a metal working machine, consisting in locally heating it through a plurality of heating periods each timed to the cycle of actions embracing the operation upon the heated portion of work.

5. A heating process for metal working machines of the character described, consisting in giving to the work a plurality of heats one in each of a succession of steps or stages of its feed, each period of heating being embraced in the period of a cycle of actions of the metal working portion of the machine upon the heated portion of work.

6. A heating process for metal working machines, consisting in locally heating a section of rod at a plurality of positions in its step by step feed into the machine, each period of heating being timed to take place within the cycle of actions embracing the mechanical operation of the machine upon the heated section.

7. An electric metal working apparatus having an intermittent or step by step feed for the work combined with means for electrically heating the section of metal to be worked at a plurality of stages in its feed into the machine, whereby the metal working operations may be intermittently repeated without delay to permit the work to reach the working heat.

8. A heating process for a metal heading machine, consisting in giving to a localized section of rod fed into the machine step by step a plurality of heating periods, each period timed to take place during a heading operation.

9. The combination with a bolt heading machine having means for feeding a blank rod into the same, of a plurality of heating electrodes each arranged to engage the same section of rod successively at a plurality of its rest positions in its step by step feed forward into the machine.

10. A heading machine having means for cutting off lengths of rod fed into the same, combined with an electrical heater adapted to heat the rod locally at each of a number of steps forward into the machine, whereby each length of rod operated upon may be heated at both ends, one for the cutting and the other for the heading operation.

11. A heading machine provided with means for cutting off successive lengths of a wire rod or blank fed into the same, combined with means for heating the rod locally at a number of positions of rest in its feed forward and for feeding it into the machine to bring one end of a heated section into position for cutting and the other into position for heading.

Signed at New York, in the county of New York and State of New York, this 3d day of October, A. D. 1919.

WOLCOTT REMINGTON.

Witnesses:
F. B. TOWNSEND,
IRENE LEFKOWITZ.